March 26, 1935.　　　J. J. GOUGH　　　1,996,015
ELECTRIC TOASTER
Original Filed Aug. 25, 1933　　3 Sheets-Sheet 1
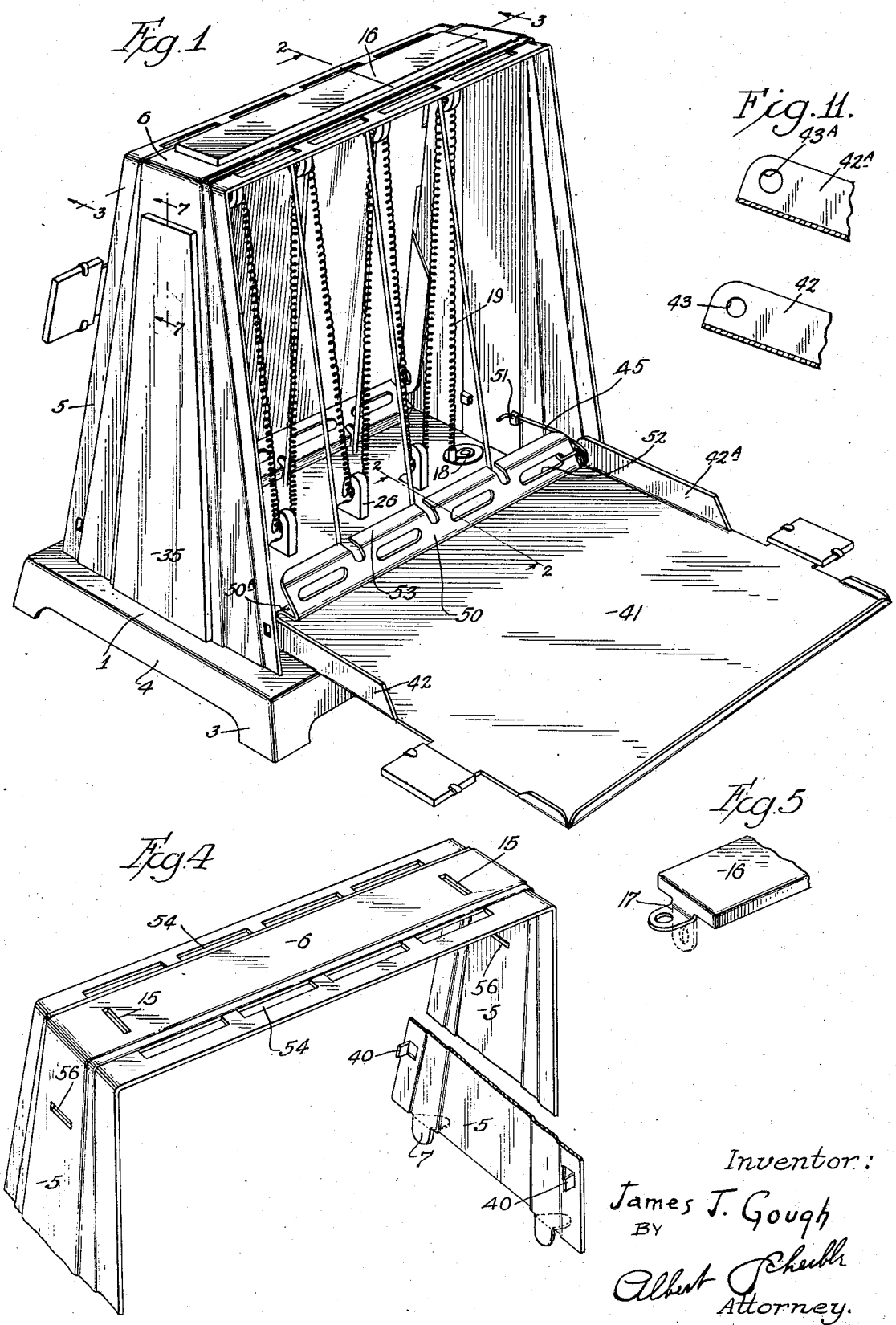

March 26, 1935.  J. J. GOUGH  1,996,015
ELECTRIC TOASTER
Original Filed Aug. 25, 1933  3 Sheets-Sheet 2
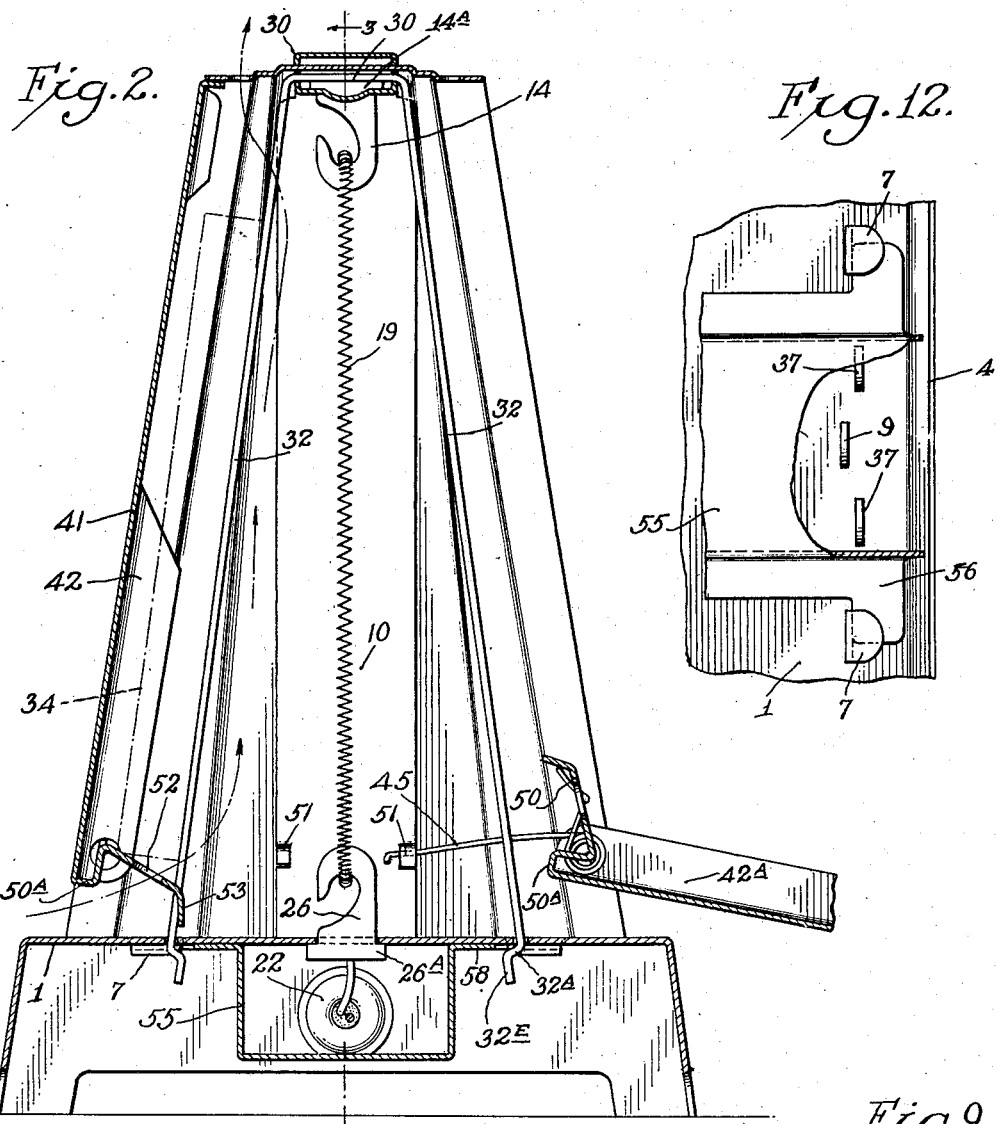

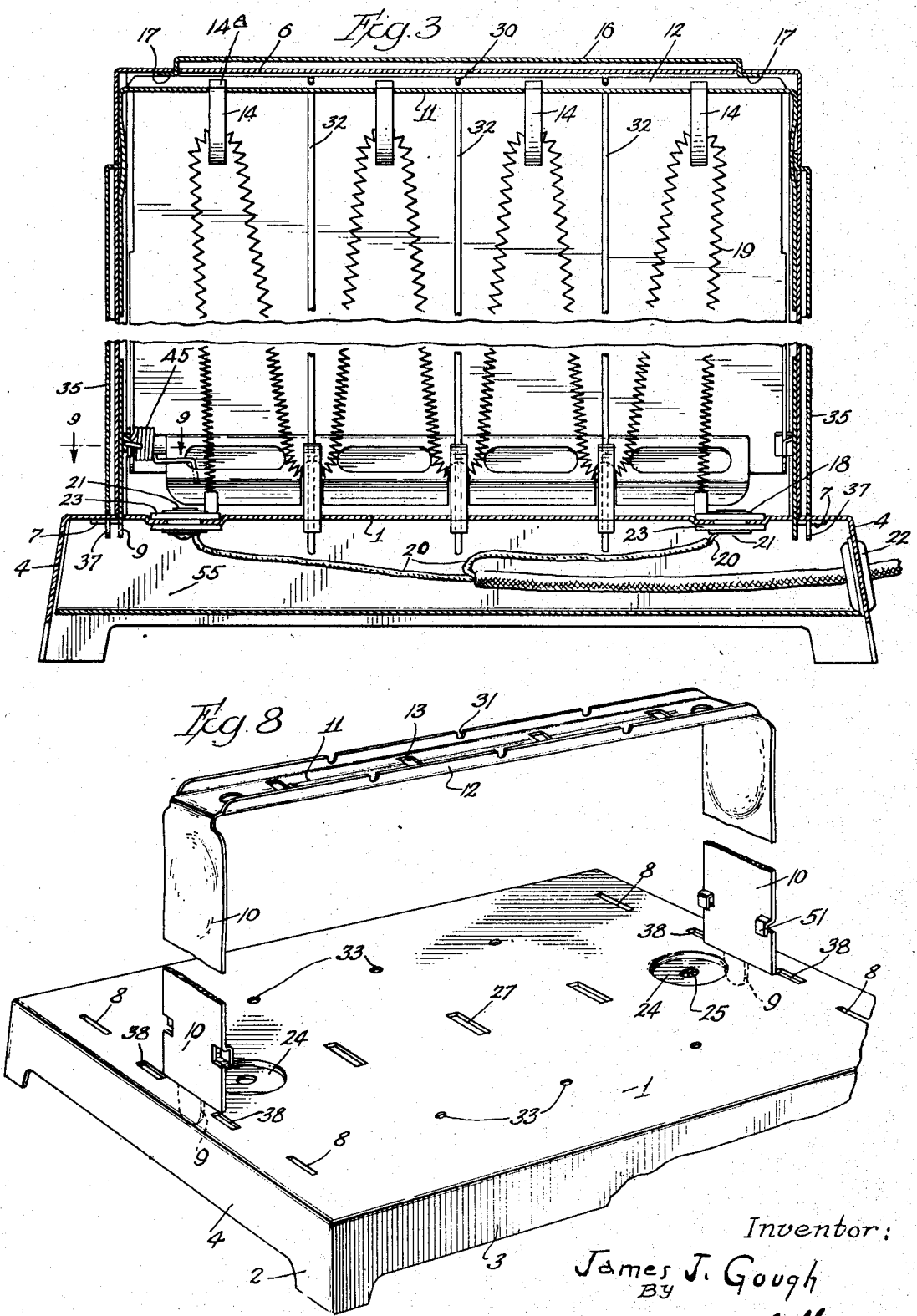

Patented Mar. 26, 1935

1,996,015

UNITED STATES PATENT OFFICE 1,996,015

ELECTRIC TOASTER

James J. Gough, Chicago, Ill., assignor to Chicago Electric Manufacturing Company, Chicago, Ill., a corporation of Illinois Refiled for abandoned application Serial No. 686,728, August 25, 1933. This application December 10, 1934, Serial No. 756,890

12 Claims. (Cl. 53—5)

This application is a refiling of my application #686,728 on an Electric toaster, filed August 25, 1933.

My invention relates to the electric toasters in which two slices of bread are supported at respectively opposite sides of a zigzagged coil or resistance wire, with a hinged door laterally outward of each slice of bread to confine the heating effect.

Generally speaking, my invention aims to accomplish these objects without materially increasing the cost of the toaster in comparison with earlier toasters of the same general type:

(1) Effectively stiffening the customary (inverted U-shaped) casing portion so as to avoid a distorting of this casing part when made of quite light metal.

(2) Constructing the stiffening means so that they can readily be attached without requiring rivets or other auxiliary fastening elements, and so that these means will also ornament the casing.

(3) Employing an inner inverted stirrup for supporting the heating wire at the upper bends of that wire, and arranging this stirrup so as to be held in place without requiring any auxiliary fastening elements.

(4) Constructing the guard wires, against which the bread rests, so that they will latch the inner stirrup to the base of the toaster before the inverted U-shaped casing portion is attached to the said base, thereby freely permitting the said base and stirrup to be handled in any position as a unit to facilitate the attaching of the said casing portion to the base.

(5) Constructing each door so that it will extend considerably lower than the slice of bread adjacent to it, thereby reducing the flow of cool air into the interior of the casing.

(6) Providing inlet and outlet openings arranged for causing air to flow upward along the inward face of each slice of bread to a sufficient extent for avoiding a scorching of the lower portion of the bread during normal toasting.

(7) Providing a novel arrangement for supporting the closure spring associated with each door, and one which will readily permit each door to be snapped into its normal pivoted position after the spring has been attached to the door.

Still further and also more detailed objects will appear from the following specification and from the accompanying drawings, in which Fig. 1 is a perspective view of an electric toaster embodying my invention, with the nearer door swung open.

Fig. 2 is a transverse vertical section through Fig. 1 along the line 2—2.

Fig. 3 is a central, longitudinal and vertical section through Fig. 1, with the midheight portion of the toaster broken away.

Fig. 4 is a fragmentary perspective view of the main (inverted U-shaped) casing member.

Fig. 5 is an enlarged perspective view of an end portion of the stiffener for the top of the said casing member.

Fig. 6 is a reduced inside elevation of one of the end stiffeners for the same casing member, drawn on a smaller scale than Fig. 1.

Fig. 7 is a fragmentary and enlarged section, taken along the line 7—7 of Fig. 1, showing the hooking of the upper end of the end stiffener of Fig. 6 to a leg of the said casing member.

Fig. 8 is a fragmentary perspective view of the base of the toaster and of the inverted (inner) stirrup supported by the said base.

Fig. 9 is an enlarged and fragmentary section taken along the line 9—9 of Fig. 3, showing the nipple around which one of the door-closing springs is coiled, together with parts adjacent to this nipple.

Fig. 9A is a sectional view, showing the other end hinge connection of the door and frame.

Fig. 10 is a vertical section, taken along the line 10—10 of Fig. 9.

Fig. 11 is a view showing the pivoting portions of the two side flanges on one of the doors, showing the difference in size of the pivoting perforations.

Fig. 12 is a fragmentary bottom view of the middle part of an end portion of the toaster.

In the illustrated embodiment, the base member of my toaster is a sheet metal punching dished upwardly and formed (as shown in Figs. 1 and 8) to afford a horizontal base top 1 supported by corner legs 2 which are stiffened by side flanges 3 and end flanges 4 depending from the said base top.

Supported by this base is a main casing member of right-angled inverted U-section (Fig. 4) comprising two legs 5 connected by a top portion 6, this member being formed of flat sheet steel but here shown as partly embossed to add to the ornamental appearance of the toaster. Each leg 5 has the major portion of its lower end seated on the base top; and also has two widely spaced fingers or tabs 7 extending beyond this lower end through slots 8 (Fig. 8) in the said base top, which tabs are clinched upwardly against the lower face of the said base top (as shown in Fig.

3) to anchor the said inverted U-shaped casing member to the base.

Before thus fastening this casing member to the base, I first interlock the top 1 of this base with tabs 9 which project downwardly respectively from the lower ends of the shanks 10 of an inverted stirrup (Fig. 8) of sufficiently smaller dimensions than the said casing member so as to fit within the latter, each of which tabs 9 merely extend downwardly through correspondingly located slots in the base top 1. This stirrup consists of a horizontal top 11 connecting the upper ends to two stirrup shanks 10, and the said stirrup top has an upwardly directed flange 12 extending along each longitudinal edge of that member, so that the said stirrup top is effectively channel-sectioned.

Moreover, this stirrup top has its main portion 11 provided with spaced transverse slots 13 (Fig. 8) for receiving the shanks of upper hooks 14 made of porcelain or other heat-insulating material. Each of these hooks has at its upper end a head 14A (Fig. 2) of larger area than one of the perforations 13 and of a height not greater than the distance to which the side flanges 12 on the inverted stirrup extend upwardly beyond the main portion 11 of this stirrup.

To secure rigidity for the inverted U-shaped casing member of Fig. 4, while making this of thin sheet metal, I provide the horizontal top portion 6 of this member near each end of that member with a transverse slot 15, as shown in Fig. 4. Then I provide a casing-top stiffener 16 (Fig. 1) of downwardly open inverted rectangular box shape and desirably narrower than the said top portion 6. This stiffener has each end flange provided with a projecting tab 17 which initially extends vertically downward (as shown in dotted lines in Fig. 5) and which thereafter is bent upward against the lower face of the top part 6 of the main inverted casing member, as shown in Fig. 3. When this top stiffener 16 is thus clinched to the said top part 6, it makes the major portion of that top part a quite stiff box-like structure, even when quite thin metal was used both for the said casing member and for the stiffener.

In assembling the stationary parts of my toaster, I may proceed as follows:

First, I fasten the two terminals 18 of a coiled high-resistance wire 19 to the base top 1 conjointly with the terminals of the two circuit wires 20 (which extend through a bushing 22 in one end flange of the base) by rivets 21. These rivets are insulated from the base top 1 in the usual manner by upper and lower washers 23, with each upper washer seating in a depression 24 (Fig. 8) in the said base top to center the shank of the corresponding rivet and to hold that rivet away from the bore of the base-top perforation 25 through which it extends.

Next, I set the inverted stirrup down on the base top 1, with the shank-end tabs 9 extending slidably through base-top slots provided for them, and drop the shanks of the upper hooks 14 through the openings 13 in the top member 11 of this stirrup. Then I support this partial assemblage so that its medial longitudinal vertical plane—namely the plane along which the section of Fig. 3 was taken in Fig. 2—is horizontal, and slide the shanks of the lower hooks 26 through the slots 27 (Fig. 8) provided for them in the base top 1, these slots being in staggered relation to the slots 13 in the top part 11 of the inverted stirrup.

The coiled resistance wire, which meanwhile extended as a loose loop beyond the base, is then hooked alternately through the upper and lower hooks in zigzag formation as shown in Figs. 1 and 3. This coiled wire, as initially formed, is resilient and longer than operative length as shown in the just named figures, so that it has to be stretched while thus looping it through the said hooks; and owing to its resiliency, this coiled wire is tensioned during this attaching, so that it draws the heads 14A of the upper hooks against the stirrup top 6, draws the head 26A of the lower hooks against the lower face of the base top 1 as shown in Fig. 2, and also clamps the shanks 5 of the inverted stirrup against this base top.

Next, the resulting assemblage is turned upright and inverted guard loops are slipped over the channel-sectioned top member of the inverted stirrup. Each of these guard loops is a U-shaped wire proportioned so that its bight or U-back 30 will extend through and seat in a pair of opposed recesses 31 (Fig. 8) in the two side flange 12 of the top of the inverted stirrup, and so that the downwardly diverging shanks 32 of this wire loop will slide through perforations 33 in the base-top 1 and project downwardly beyond this base-top.

In forming these guard loops, I also provide each shank 32 near its lower end with a reverse bend affording an offsetting portion 32A (as shown in Fig. 2) which will engage the lower face of the base-top 1 when the said shank has its end portion slid through the corresponding base-top perforation 33, while disposing the extreme end part 32E of that shank parallel to its main portion 32. By making each such perforation 33 slightly larger in diameter than the wire from which each guard loop is formed, I enable the assembler to snap these shank end portions through the said perforations. And, when the length of each main shank portion 32 is substantially equal to the distance between the lower end of a base top perforation 33 and the lower edge of the corresponding flange recess 31 in the top of the inverted stirrup, the offsetting guard loop portions 32A latch the guard loop to both the base-top and the stirrup, and hold the main loop portions 32 taut.

To stiffen the upright legs 5 of the inverted U-shaped casing portion, I also provide hollow end stiffeners for each of these legs, and preferably arrange these stiffeners so that no clinching or other tool operation and no auxiliary fastening element is required for holding each end stiffener in its normal position. For this purpose, I construct each end stiffener 35 after the manner of a sidewise-opening box having its lower end cut away, with a hook-like tab 36 projecting from its upper end and with two spaced tabs 37 projecting downwardly from its lower end, as shown in Fig. 6. To cooperate with these tabs, I provide each casing end 5 in its upper portion with a perforation 56 (Fig. 4) through which the upper hook-like tab 36 can readily be hooked as in Fig. 7, the offsetting portion 36A being preferably at right angles to both the main part 35 of the end stiffener and the main part 36 of the said tab. Then I also provide the base-top 1 near each end thereof with two spaced slots 38 (Fig. 8) through which the lower tabs 37 on an end stiffener can slidably extend downwardly.

Thus formed, each stiffener can be hookingly attached to one leg 5 of the (inverted U-shaped) main casing member while the latter is freely held. This member is then slid over the inverted stirrup on the previously described assemblage so as to have the end tabs 7 (Fig. 4) of the said member extend (as in Fig. 3) through the base-top perforations provided for them, while the bottom tabs 37 on each end stiffener extend slidably through the slots 38 in the said base-top. The thus enlarged assemblage is then inverted, and the leg-end tabs 7 on the main casing member (which temporarily extended vertically through the base-top) are then clinched against the lower face of this base-top as shown in Fig. 3.

With the legs of the main casing member and the shanks of the inverted stirrup suitably proportioned in height, this assembling causes the top part 6 of the said casing member to bear downwardly on the upper edges of the side flanges 12 (Fig. 8) of the top portion of the inverted stirrup, thereby clamping the lower ends of the stirrup shanks to the base-top. At the same time, the interengaging of the offset portion 36A of each end stiffener with the adjacent leg 5 of the main casing portion (as shown in Fig. 7) also clamps the lower end of that stiffener against the base-top. Consequently, neither the tabs 9 of the stirrup shanks (Fig. 8) nor the bottom tabs 37 on the end stiffeners need to be clinched over, so that the number of needed fastening operations is quite small.

Each of the legs or end portions 5 of the main casing member also has two integral fingers 40 formed from it near each lower corner, as shown in Fig. 4, with each finger extending toward alining with a similar finger on the other leg, so that each two opposed fingers can serve as pivots for one of the usual two side doors of the toaster. Each door has side flanges projecting inwardly from its main portion, and has each such flange provided near the lower end of the door with a perforation through which one of the said pivot fingers normally extends. However, while one such flange 42 (Fig. 11) has its perforation 43 of such a size that the pivot finger 40 on the adjacent casing end will journal directly in this perforation, the companion perforation 43A in the other flange 42A is larger in diameter than the width of the adjacent pivot finger, so that a nipple 44 can be interposed between the last named pivot finger and the bore wall of the flange perforation 43A, as shown in Figs. 9 and 10.

This nipple 44 is inserted slidably through the perforation 43A, desirably presents head outside the flange 42A; and this nipple has its inner end forked, as shown in Fig. 9, so as to straddle one side edge of the hereafter described bread-supporting flange 50 on the door. Coiled around the main portion of the nipple 44, laterally inward of the side flange 42A through which this nipple extends, is a spring 45 which has one end hooked through one of the hereafter recited air-admitting openings 52 in the bread-supporting flange 50, while the other end of the spring interlocks with a hook 51 formed on the adjacent shank 10 of the (inner) inverted stirrup (as shown in Figs. 2 and 8) to tension the spring.

To allow for the just recited nipple and spring arrangement and to secure other advantages, I extend the main portion 41 of each door downwardly beyond its pivot axis, as shown at the left-hand side of Fig. 2, and provide the door at its lower end with an extension flange 50 which is narrower than the spacing between the side flanges 42 and 42A of the door (as shown in Fig. 9). This door-extension flange includes a portion 50A of normally approximately upright J-section connecting the lower end of the main door portion 41 with the main flange part 50. The main flange part 50 slopes downwards inwardly of the toaster, so that a slice of bread 34 seated on this flange (as shown in dotted lines in Fig. 2) will have only the outer edge of the toast resting on the said main flange part, thereby permitting air to flow through apertures 52 in this flange. In addition, the inner end portion 53 desirably normally depends vertically almost to the top 1 of the toaster base, so as to restrict the admission of air into the casing of the toaster.

I also provide the top 6 of the main casing member near each longitudinal edge of this top with longitudinal rows of apertures 54, as shown in Figs. 1 and 4. With the door flanges and the superposed rows of apertures thus arranged, the heat within the toaster readily causes air to enter through the flange apertures 53 and then to flow under the bread and upwardly along the inward face of the bread and out through the top apertures 54, as shown by the arrows in Fig. 2. This flow of air tends to equalize the temperature of the inner face of the bread and effectively prevents the lower part of the bread from being scorched by the time the upper part of the bread is toasted.

With my above described door, thimble and spring arrangement, the straddling of an edge of the bottom flange on the door combines with the door-flange perforation through which the nipple extends to hold the nipple substantially coaxial with the two pivot fingers for that door. And to prevent this nipple from sliding outwardly, I desirably form the nipple so that an edge portion of the straddled door flange is frictionally gripped between two parts of it, as shown in Fig. 10.

Thus arranged, the door, thimble and spring assembly can be freely handled as a unit for attaching the door to the inverted casing member. This is done by first slipping the perforated end of one door flange over the corresponding pivot finger 40 on the main casing member, and then pressing the door sidewise toward the casing end carrying that finger, while also digitally flexing the opposite casing end further from the one carrying the aforesaid finger, so that the head of the thimble can clear the tip of the companion pivot finger. With suitably proportioned lengths of the pivot fingers, the door can readily be attached in this manner, owing to the flexibility of the rather thin metal from which the main (inverted U-shaped) casing portion is formed. Then the free shank of the spring 45 can readily be snapped under the adjacent hook 51 while the door is still open. And by manually releasing the spring from the said hook and then reversing the just recited attaching procedure, the unitary assemblage of the door with the thimble and the spring can readily be detached from the main casing portion in case the door or some other part has become damaged.

In practice, I also provide a trough 55 underhanging the base-top 1 (as in Figs. 2 and 3) for preventing the finger of a user from accidentally contacting with the wire terminals. This trough desirably has flanges 58 extending laterally outward from the upper edges of its trough sides, as shown in Fig. 2, so that the clinched tabs 7 (Fig. 4) of the inverted U-shaped casing member may underhang these flanges as well as the base-top 1, thereby conjointly clamping the said casing member to both the trough and the base-top.

With my toaster thus arranged, most of the metal parts can be manufactured by simple punch-press operations, while the assembling of the parts consists of simple sliding operations and requires only a few clinching operations. Moreover, the two terminal-fastening rivets 21 are the only auxiliary fastening elements required for the entire toaster, and all of the sheet metal parts can be formed of light sheet metal while still permitting the stiffeners (together with the interfitting of the main casing member with the inverted stirrup) to supply greater rigidity than is commonly found in toaster casings formed of heavier metal.

However, while I have heretofore described my invention in an embodiment including many desirable details of construction and arrangement, I do not wish to be limited in these respects, since many changes might be made without departing either from the spirit of my invention or from the appended claims. So also, I do not wish to be limited to the conjoint use of the numerous novel features here disclosed.

I claim as my invention:

1. In an electric toaster, a base member; an inverted U-shaped casing member presenting a top portion and two legs, each leg being secured at its lower end to the base member; an inverted stirrup extending within the said casing member and clamped between the base member and the said top portion of the casing member, and a heating element interposed between the base member and the said top portion.

2. In an electric toaster, an assemblage of elements as per claim 1, in which the shanks of the stirrup bear flatwise respectively against the inner faces of the said two legs.

3. In an electric toaster, an assemblage of elements as per claim 1; and a plurality of guard wires interposed between the base member and opposite sides of the top of the said inverted stirrup, the said guard wires being interlocked with both the said stirrup top and the base member to clamp the stirrup to the base member prior to the attaching of the said casing member to the base member.

4. In a casing for an electric toaster, a base member provided with perforations, an inverted U-shaped stirrup having its legs seated on the base member and having the lower end of each leg provided with a finger extending downwardly through one of the said perforations; and an inverted U-shaped casing member having its top in downward engagement with the top of the said stirrup, and having its lower ends fastened to the base member to clamp the said stirrup against the base member.

5. In a casing for an electric toaster, a base member; an inverted U-shaped casing member having the lower ends of its legs seated upon and fastened to the base member, the said casing member having a horizontal top portion provided with two spaced slots; and a stiffener comprising an inverted and downwardly open rectangular box-like punching having the lower edges of all four box sides seated on the said top portion and having a tab extending downwardly from each end of the stiffener and hooked through one of the said slots.

6. In a casing for an electric toaster, a base member presenting a raised base top provided with perforations; an inverted U-shaped casing member having the lower ends of its legs fastened to the said base top and having each leg provided in its upper portion with a perforation, and two stiffeners each bearing against the outward face of one of the said legs; each stiffener having at its lower end a tab extending downwardly through one of the said perforations in the base top, and having at its upper end a tab hooked through a perforation in the adjacent leg and bearing against the inner face of that leg, whereby the fastening of the said legs to the base top affords a rigid assembly of the said base member, casing member and the two stiffeners.

7. In a toaster, a casing including two substantially upright end members and a base connecting the lower ends of the end members; each end member having a pivot finger projecting from it toward the other end member, the pivot fingers alining axially with each other; a door spanning the end members and having two end flanges each provided with a perforation, the pivot element on one of the end members being journaled directly in the perforation in one of the end flanges of the door; a nipple extending through the perforation in the other end flange of the door, and a spring coiled around the nipple and having its ends interlocked respectively with the door and with the end member adjacent to the spring.

8. In an electric toaster, an assemblage of elements as per claim 7, in which the nipple is clinched to the door and the spring is laterally inward of the door flange adjacent to it, whereby the nipple and spring together with the door constitute a unitary assembly when the door is detached from the end members of the casing.

9. In a toaster, an assemblage of elements as per claim 7, in which the inner end of the nipple is forked and straddles a portion of the door.

10. In a toaster of the class having two spaced end members extending from a base to a top member, a door pivoted near its lower edge respectively to the two end members, the door comprising a main portion extending both upwardly and downwardly from the axis of the said pivoting and a continuation portion; the continuation portion being recurved inwardly and then upwardly at an acute angle to the general plane of the main portion of the door, and thereafter recurved inwardly and at a downwardly sloping angle to the said plane, the juncture of the said recurved portions affording a ridge upon which the lower edge of a slice of bread can be seated during the toasting.

11. In a toaster, an assemblage of elements as per claim 10, in which the downwardly sloping portion of the door is perforated to permit air to flow under the lower edge of the slice of bread.

12. In a toaster, an assemblage of elements as per claim 10, in which the downwardly sloping portion of the door is perforated to permit air to flow under the lower edge of the slice of bread seated on the said ridge; and in which the said top member is provided with perforations adjacent to and inward of the upper end of the door to cooperate with the perforating of the said sloping portion of the door, whereby convection currents will cause air to flow upwardly along the inner face of the slice of bread.

JAMES J. GOUGH.